United States Patent [19]
Biedenbach

[11] Patent Number: 5,201,627
[45] Date of Patent: Apr. 13, 1993

[54] WASHER FOR SCREWS

[75] Inventor: Marita Biedenbach, Hünfeld, Fed. Rep. of Germany

[73] Assignee: Hubert J. Koch, Hunfeld, Fed. Rep. of Germany

[21] Appl. No.: 566,929

[22] Filed: Aug. 14, 1990

[30] Foreign Application Priority Data

Sep. 9, 1989 [DE] Fed. Rep. of Germany ....... 3930209

[51] Int. Cl.$^5$ ......................... F16B 33/00; F16B 43/00
[52] U.S. Cl. ................................... 411/531; 411/156; 411/368; 411/915
[58] Field of Search .............. 411/147, 148, 155, 156, 411/368, 369, 370, 480, 481, 531, 533, 545, 912, 915; 403/283, 405.1; 439/883

[56] References Cited

U.S. PATENT DOCUMENTS

| 436,737 | 9/1890 | Lewis | 411/156 |
| 1,343,209 | 6/1920 | Gwyer | 403/283 |
| 1,793,453 | 2/1931 | Barili | 411/156 |
| 1,814,502 | 7/1931 | Barwood | 411/915 |
| 2,524,911 | 10/1950 | Horatschke et al. | 411/368 |
| 2,769,606 | 11/1956 | Larson | 411/156 |
| 3,315,720 | 4/1967 | Gutshall | 411/156 |
| 3,882,752 | 5/1975 | Gutshall | 411/369 |

FOREIGN PATENT DOCUMENTS

| 803964 | 4/1951 | German Democratic Rep. | 411/531 |
| 545179 | 6/1956 | Italy | 411/155 |

Primary Examiner—Neill R. Wilson
Attorney, Agent, or Firm—Lowe, Price, LeBlanc & Becker

[57] ABSTRACT

A ring-shaped washer (10) especially for wood screws (28) has an external circumferential edge area, which is directed downwards and cuts the wood (26) when the washer is being driven into it. At the same time the wood below the washer is compressed. This primarily serves to avoid a splitting up of the wood when screwing in the wood screw (28) and at the same time to increase the strength of the screwed connection.

14 Claims, 2 Drawing Sheets

WASHER FOR SCREWS

BACKGROUND OF THE INVENTION

1. Field of the Invention

This invention relates to a ring-shaped washer for screws, especially for wood screws, but also for screws for materials used instead of wood such as chipboards, plasterboards and the like. The invention primarily relates to a washer for countersunk screws, but basically it can also be used for other screws such as raised cheese-head screws, roundhead screws or the like. The primary field of application of said washer is in conjunction with a countersunk screw which is designed as a cross-recessed screw in most cases, which is screwed into the materials to be fastened without predrilling. Such screws are on the market for example under the designation of SPAX screws.

2. Prior Art

When fastening construction elements made from wood such as battens or the like the problem often arises that when screwing the screw into the wood, especially when the screw is located close to the end of a batten or the like, the wood is torn due to the wedging effect the countersunk head of the screw exerts on the wooden material when the countersunk screw is screwed in. Moreover, in the case of relatively soft types of wood one can often not avoid in practice that the depth to which the head of the countersunk screw is screwed into the wood, manually or by means of an electric screw driver, varies depending on the force applied. In addition, warped wood and battens can often not be used, as their internal stresses are too great for the wooden material to be forced into the desired position by means of the screw; the wood would tear again, or the head would penetrate too deeply into the wooden material.

SUMMARY OF THE INVENTION

Hence the primary object to be solved by the present invention is to provide a washer which prevents the screw from penetrating too deeply into the wood and avoids a tearing of the wood when the screw is driven in. In addition, the washer of the invention should, when used in conjunction with a countersunk screw, guarantee an essentially plane surface of the wood when the screw has been screwed in.

This object is essentially solved in that the external edge area of the washer is directed downwards, i.e. away from the screw head. In a preferred embodiment of the invention the washer has an approximately semi-circular or U-shaped cross-section and the lower edge of the external edge area is designed as a cutting edge.

Further preferred embodiments of the invention can be seen from the further subclaims.

The washer of this invention is either beaten into the wood at the point where the fastening is to be before driving in the screw, and then the screw is screwed into the wood, or the washer is driven into the wood's surface together with the screw by screwing in the screw. The lower edge - preferably designed as a cutting edge - of the edge area of the washer of the invention, which is directed downwards, cuts the wood fibers in this area, and at the same time the material below the washer is compressed and compacted.

Whereas in the case of the state of the art the conical bottom of the countersunk screw pushed the wood away obliquely to the sides when the countersunk head was driven into the wooden material and thus there was always the danger of a split or a crack in the wooden material, the use of the washer of the invention causes the forces to be transmitted to the wood via the washer and thus act upon the wood at right angles to the wood's surface, that is parallel to the screw, which means that the wedging effect of the countersunk screw is eliminated and thus the danger of a split or a crack is drastically reduced or even excluded. The fastening force applied via the screw thus fully acts in the direction of the elements to be connected with each other, which results in a higher quality of the fastening. This means that the fastened connection can be subjected to higher stresses, and the screw permanently fits and remains in position. Warped wood can now be reliably fastened by means of screws, too, so that one becomes less dependent on the quality of the wood used.

The compression and compacting of the wood fibers below the washer of the invention now guarantees that fastening points close to the end of the wooden material can neither tear any longer.

The curved shape of the washer of the invention gives the washer an outstanding strength and stability on the whole, so that it essentially retains its original shape even if great forces are applied in driving it into the wood. A bending up of the external edge area of the washer when the washer is being driven into the wood is virtually excluded.

The upper side of the washer of the invention is essentially flush with the wood's surface. With regard to the countersunk screws to be used together with it, the washer is dimensioned in such a way that the plane upper side of the head of the countersunk screw is also essentially flush with the upper side of the washer. The wood's surface thus essentially remains plane even after the washer has been driven in and the screw has been screwed in.

When the washer of the invention is used, the screw can be screwed in and out as often as one desires without the washer changing its position. The inside dimensions or the inside shape of the washer are in such a way that the countersunk head inside of it is given an ideal position, centers itself and can accommodate countersunk screws whose heads have diameters of different sizes.

Due to the distinctly improved fastening ability of the connection, which can be achieved when using the washer according to the invention, the number of fastening elements, that is to say screws together with washers, which are necessary for a certain connection, can be distinctly reduced. This results in savings of material as well as labor.

In the following several embodiments of the invention are explained in detail with reference to the drawings.

DESCRIPTION OF PREFERRED EMBODIMENTS

Figure 1:
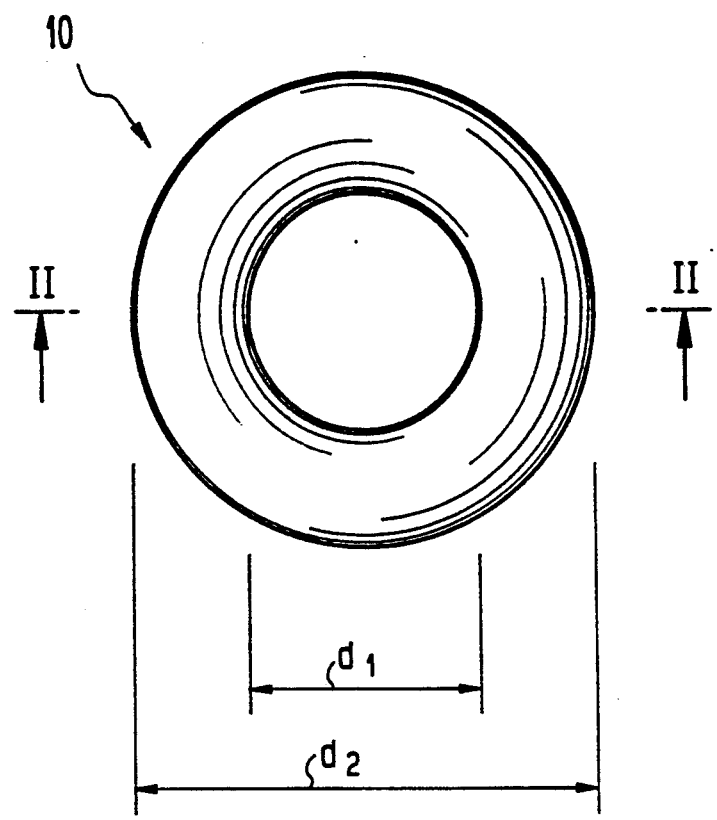
FIG. 1 is a top view onto a washer of the present invention.
Figure 2:
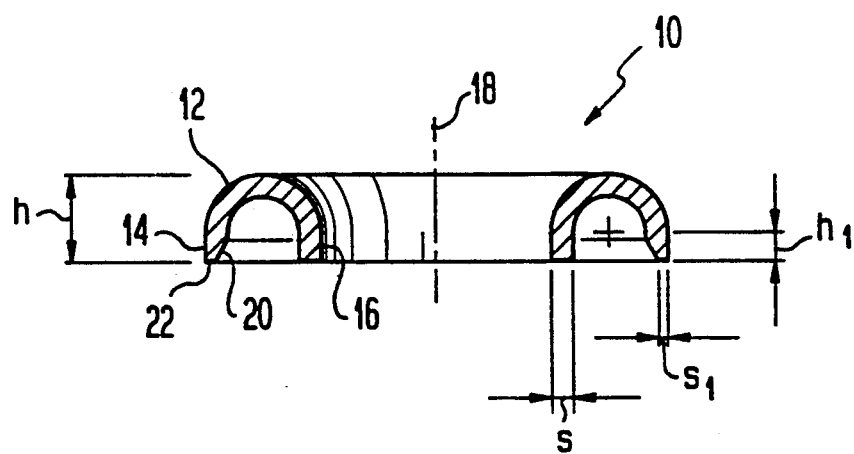
FIG. 2 is an enlarged sectional view of the washer of FIG. 1 in the direction of arrows II—II of FIG. 1.

The washer according to FIG. 1 and 2 is, as a whole, designated by reference number 10. The ring-shaped washer 10 comprises a central annular section 12, whose cross-section is curved to show a semicircular shape, as well as two end sections 14, 16, which extend from the two lower ends of the central annular section 12 and are parallel or concentric to the central axis 18 of the washer 10, wherein the internal end section is designated by reference number 16 and the external end section by reference number 14. Both of the end sections 14 and 16 essentially have the same height, that is to say the same dimension measured in the direction of the central axis 18.

At the internal edge of the external end section 14 a chamfer 20 is formed, which, in the case of the present embodiment, forms an angle of 30 degrees to the axis 18. This chamfer 20 causes the external lower edge of the washer 10 to act as a cutting edge 22.

In the case of the embodiment represented, the external diameter $d_2$ of the washer is 16 mm, the internal diameter $d_1$ is 8 mm, the height h is 3 mm, the heights $h_1$ of the external and internal end section are 1 mm each, the thickness of the material s is 0.75 mm and the width $s_1$ of the cutting edge 22 is approximately 0,3 mm. The radius of curvature of the central annular section 12, which has a semicircular cross-section, is 2 mm. It goes without saying that the dimensions mentioned above have to be adapted to the sizes of the screws used in each case.

In general, one can state that the external diameter $d_2$ of the washer should approximately be twice ($\pm 20\%$) the value of the internal diameter $d_1$, and that the axial extension of the end section 14/16 should approximately amount to a quarter up to the whole, preferably approximately half of the axial extension of the curved annular section 12.

Figure 3:
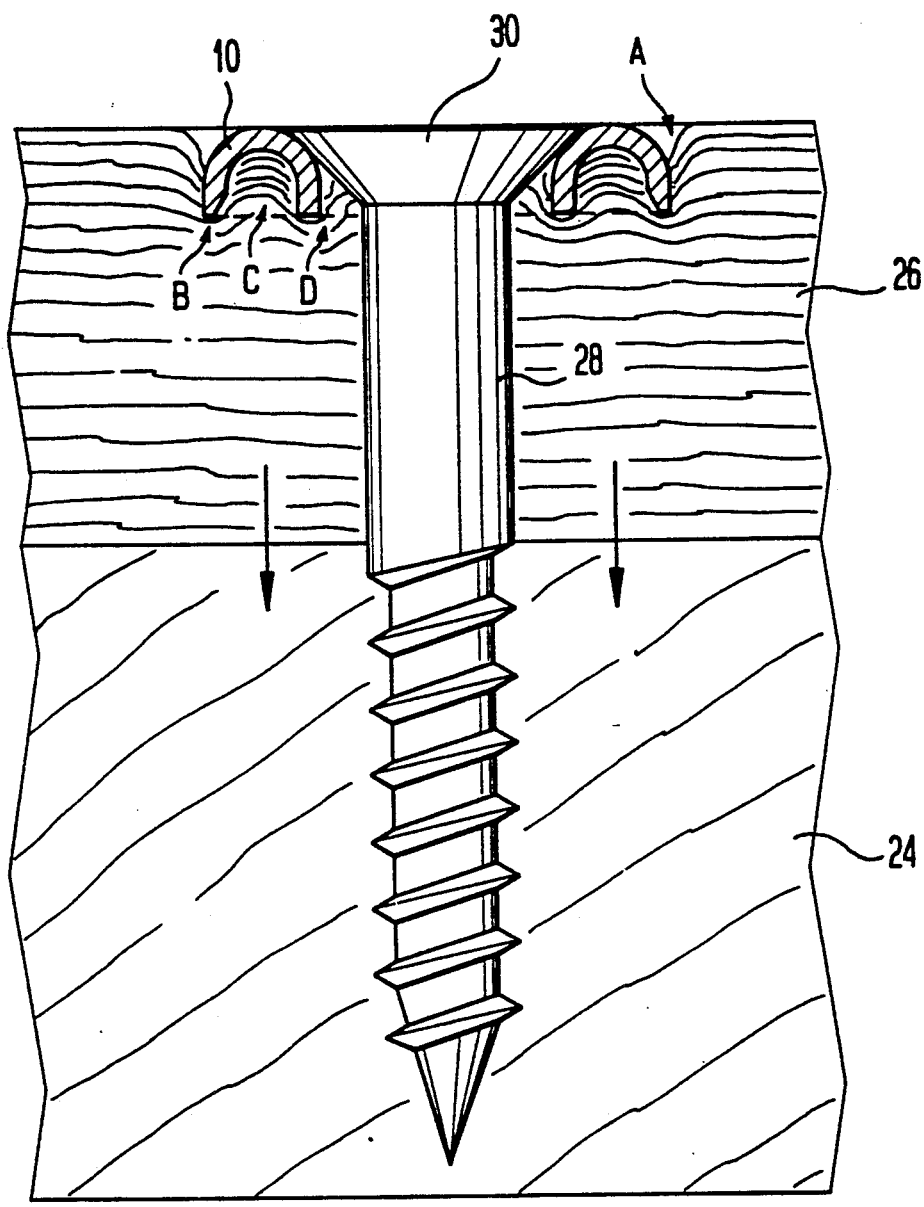
FIG. 3 is a side view, partly in section, showing the washer of FIGS. 1 and 2 screwed into the material.

FIG. 3 is now referred to. Here a first wooden part 24 can be seen, at which a second part 26, for example a wooden batten, is fixed by means of a wood screw 28 with a countersunk head 30 and the washer 10 according to FIG. 1 and 2. As is clearly evident from FIG. 3, the washer 10 has been driven into the wood of the second part 26 approximately so far that the upper side of the washer 10 is approximately flush with the upper side of the second part 26. Driving the washer into the wood can have been carried out by beating the washer 10 into the wood at the position desired before screwing in the wood screw 28; however, it is also possible to drive the washer 10 into the wood's surface by screwing in the screw 28.

The screw 28 is supported at the conical lower side of its countersunk head 30 on the internal area of the washer's central annular section 12, with the upper side of the countersunk head 30 being approximately flush with the upper side of the washer 10 and thus approximately flush with the upper side of the second part 26.

As is clearly evident from FIG. 3, the wood fibers at the upper side of the second part 26 have been cut in the area A by means of the cutting edge 22 at the external lower circumference of the washer 10 when the washer 10 was driven into the second part 26, and at the same time the wood below the washer 10 has been compressed and compacted in the areas B, C and D; this, on the one hand, helps to avoid an undesirable splitting of the wood and, on the other hand, prevents a further driving into the wood of the washer 10 even if very great forces are acting. As is further evident from FIG. 3, the conical countersunk head 30 does not exert any wedging effect when the washer according to the invention is used, but the forces are virtually exclusively directed downwards parallel to the screw 28.

Figure 4:
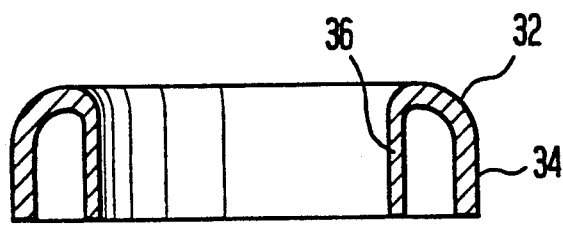
FIG. 4 is a sectional view of a further embodiment of a washer of the present invention.

In FIG. 4 an alternative shape of a washer according to the invention is represented. Here the cross-section of the central annular section 32 is not exactly semicircular and the internal end section 36 is thinner than the external end section 34.

The embodiment according to FIG. 1 to 3 is just to be seen as a preferred embodiment. It is clear to the expert that numerous kinds of modifications are possible. For example, the external and internal edges of the washer do not have to end on the same level. Instead of a semicircular or circular curvature, other curved shapes are certainly conceivable as well, for example the shape of a U with more pronounced curvatures at the corner areas. Depending on the material used, the formation of a cutting edge 22 can be done without, if, due to the small material thickness, a cutting effect can be achieved even without such a cutting edge. The cutting effect is preferably effected by the external edge area, which is directed downwards, but it is also conceivable that the cutting effect is achieved by the internal edge area, which is directed downwards, and in this case the external edge area, which is directed downwards, is entirely or at least partially done without.

The washer according to the invention preferably consists of metal such as iron, steel or brass. It can be galvanized, chromium or nickelplated, and can also be painted if required. Due to the shape of the washer in its internal area facing the central axis 18, especially due to the circular or even chamferred design in that area, one size of washer can fit for several sizes of screws.

Although the washer according to the invention has primarily been developed for countersunk screws, it goes without saying that also in connection with other types of screws at least part of the advantages described can be achieved.

What is claimed is:

1. A ring-shaped washer for use with wood screws, wherein:
   an external end section of the washer is formed straight to extend in a direction parallel to an axis of the washer away from a portion of the washer to be contacted by a screw head ad the washer comprises a curved central annular section extending into said external end section concentric with the axis of the washer, the curved central annular section having an essentially semicircular cross-section, and wherein
   an internal end section of the washer is formed straight and is directed away from the screw head in the same direction as said external edge portion.

2. The washer according to claim 1, wherein:
   an edge of the external end section of the washer is formed as a cutting edge.

3. The washer according to claim 1, wherein:
   a ratio of the external diameter of the washer to the internal diameter of the washer is in the range 1.6 to 2.4.

4. The washer according to claim 1, wherein:
   a ratio of the axial length of the external end section to the axial length of the washer as a whole is in the range 1/5 to ½.

5. The washer according to claim 4, wherein:

said ratio is equal to ⅓.

6. The washer according to claim 2, wherein:
a ratio of the axial length of the internal end section to the axial length of the washer as a whole is in the range 1/5 to ⅓.

7. The washer according to claim 6, wherein:
said ratio is equal to ⅓.

8. The washer according to claim 1, wherein:
an end face of the external end section facing away from said curved central annular section and an end face of the internal end section facing away from said curved central annular section are both essentially in the same plane.

9. The washer according to claim 1, wherein:
the washer is made of a metal.

10. A ring-shaped washer, comprising:
an annular form having a generally U-shaped cross-section in an axial plane, wherein a first arm of said U-shape corresponds to an inner periphery and a second arm of said U-shape corresponds to an outer periphery of said annular form, both arms extending to respective predetermined lengths parallel to an axial direction of the washer, and
said outer periphery is provided a chamfer at a distal edge.

11. The washer according to claim 10, wherein:
a portion of an external surface of the washer is of semi-circular cross-section.

12. A ring-shaped washer for use with a screw, wherein:
an external end section of the washer is directed away from a portion of the washer to be contacted by a screw head and extends in a direction parallel to an axis of the washer,
a lower edge of the end section portion of the washer is formed as a cutting edge, and
the cutting edge is formed by chamfering an inner end part of the external end section.

13. A ring-shaped washer, comprising:
an annular form having a generally U-shaped cross-section in an axial plane, wherein a first arm of said U-shape corresponds to an inner periphery and a second arm of said U-shape corresponds to an outer periphery of said annular form, both arms extending to respective predetermined lengths parallel to an axial direction of the washer, and
said first and second arms are of equal length.

14. The washer according to claim 13, wherein:
a portion of an external surface of the washer is of semicircular cross-section.

* * * * *